(No Model.)
J. W. DUNN.
FOLDING FEED RACK.
No. 364,229. Patented June 7, 1887.
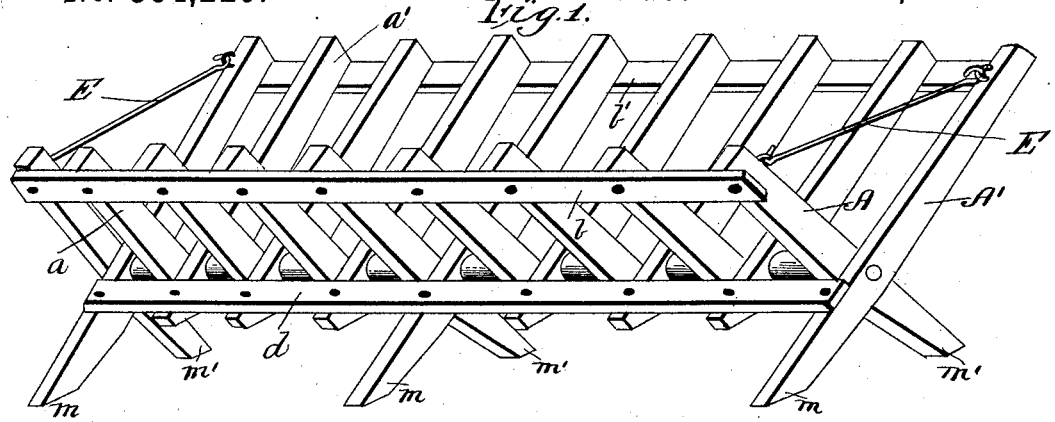
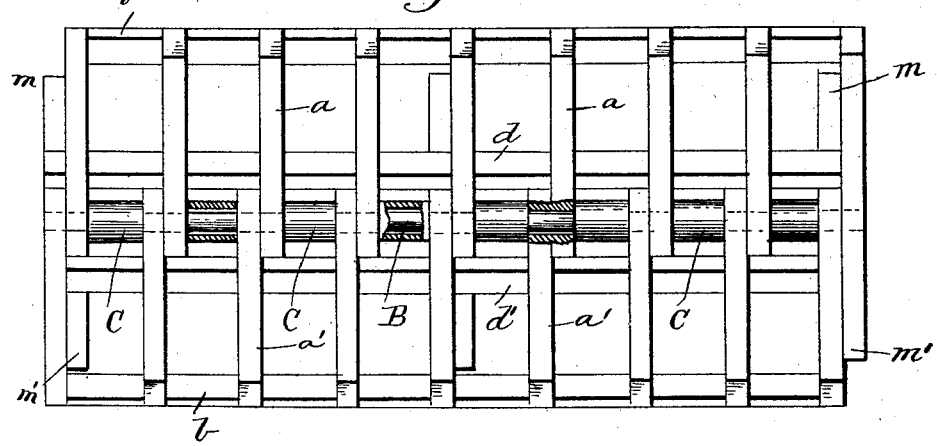
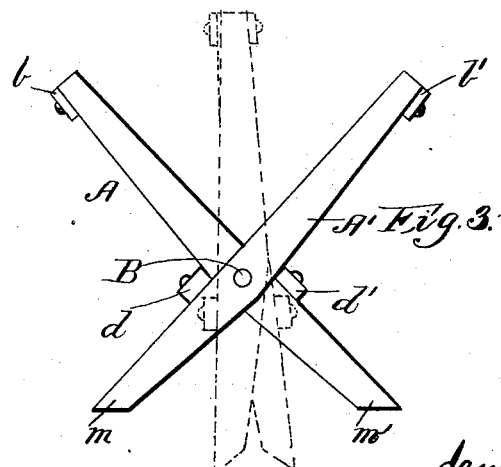
Witnesses
R. C. Laurie
Sarepta Specht
Inventor
James W. Dunn
By his Attorneys
R. S. & A. P. Lacey

UNITED STATES PATENT OFFICE.

JAMES W. DUNN, OF NEW BLOOMFIELD, MISSOURI.

FOLDING FEED-RACK.

SPECIFICATION forming part of Letters Patent No. 364,229, dated June 7, 1887.

Application filed March 26, 1887. Serial No. 232,546. (No model.)

*To all whom it may concern:*

Be it known that I, JAMES W. DUNN, a citizen of the United States, residing at New Bloomfield, in the county of Callaway and State of Missouri, have invented certain new and useful Improvements in Folding Feed-Racks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to folding and portable feed-racks for horses and stock generally.

The object of the invention is the production of a rack which can be readily folded and unfolded and is self-supporting when opened.

The invention consists in the novel features hereinafter more fully described, claimed, and shown in the annexed drawings, in which—

Figure 1 is a perspective view of a rack embodying my invention; Fig. 2, a plan view, parts broken away; Fig. 3, an end view showing the rack folded by dotted lines; Fig. 4, a transverse section on the line X X of Fig. 1.

The rack is composed of two sections, A and A', pivotally connected at their lower ends. The sections are composed of a series of slats or bars, $a$ and $a'$, respectively. The slats of one section fit against the slats of the opposite section, and are pivotally connected together by the rod B, which extends the full length of the rack and forms a common pivot for all the slats. The slats are spaced apart, and filling-pieces or washers C, mounted upon the rod B, are interposed between the slats and hold them at a fixed distance apart. The upper ends of the slats are secured together by the strips $b$ and $b'$, one strip being provided for the slats of each section. These strips are fastened on the outer faces of the slats, so as not to interfere with the sections folding into the plane corresponding with one section, as shown by dotted lines in Fig. 3. The slats of each section extend a short distance below the rod B, and the lower ends are connected by the strips $d$ and $d'$, respectively, secured to their outer sides, and which are adapted to impinge against the slats of the opposite section when the rack is unfolded and held open. Some of the slats of each section are projected below the strips $d$ and $d'$, and form legs $m$ and $m'$, which support the rack and hold it from the ground.

It will be noticed that the slats of each section composing the rack are united at their diagonally-opposite ends by strips, and the lower strips form stops, which impinge against the strips of the opposite section and limit the unfolding of the rack. The device is simple, strong, light, and can be readily transported and quickly folded and unfolded. When folded, the two sections occupy only as much space as ordinarily occupied by one section alone, thus economizing space. When unfolded, the two sections are still further strengthened by the brace-rods E, placed at each end of the rack and at the points intermediate such ends. The rods are hook-shaped at each end, and these hooks $e$ are adapted to engage with the staples $e'$ in the bars or slats. Besides bracing the sections, the end rods will prevent the animals climbing into the rack.

Having thus described my invention, what I claim, and desire to secure by Letters Patent, is—

As an improved article of manufacture, the herein shown and described portable folding feed-rack, composed of two sections, each section consisting of a series of slats spaced apart and the slats of one section corresponding with and adapted to fold in the spaces between the slats of the other section, the rod extending the full length of the rack and uniting the slats of the sections near their lower ends, the strips uniting the outer lower ends of the slats of each section and adapted to limit the unfolding of the rack, the filling-pieces mounted upon the rod and interposed between the slats, the brace-rods, and the legs forming a continuation of some of the slats, substantially as described.

In testimony whereof I affix my signature in presence of two witnesses.

JAMES W. DUNN.

Witnesses:
W. M. LONGLEY,
CHAS. H. CHRISTIAN.